United States Patent [19]

Tanigawa et al.

[11] Patent Number: 5,039,292
[45] Date of Patent: Aug. 13, 1991

[54] DEVICE FOR MANUFACTURING MAGNETICALLY ANISOTROPIC MAGNETS

[75] Inventors: Shigeho Tanigawa, Konosu; Katsunori Iwasaki; Yasuto Nozawa, both of Kumagaya, all of Japan

[73] Assignee: Hitachi Metals, Ltd., Japan

[21] Appl. No.: 554,400

[22] Filed: Jul. 19, 1990

Related U.S. Application Data

[62] Division of Ser. No. 274,570, Nov. 23, 1988, Pat. No. 4,960,469.

[30] Foreign Application Priority Data

Nov. 27, 1987 [JP] Japan .................. 62-299200

[51] Int. Cl.$^5$ .............................. B22F 3/12
[52] U.S. Cl. ...................... 425/78; 264/108; 264/DIG. 58; 425/414; 425/420; 425/DIG. 33
[58] Field of Search ............. 425/78, 407, 408, 414, 425/420, 468, 383, 392, 393, 394, 403, DIG. 33; 264/DIG. 58, 23, 24, 108

[56] References Cited

U.S. PATENT DOCUMENTS

| | | | |
|---|---|---|---|
| 3,694,127 | 9/1972 | Takahashi et al. | 425/78 |
| 4,087,221 | 5/1978 | Munson et al. | 425/78 |
| 4,521,360 | 6/1985 | Fiorentino | 425/78 |
| 4,710,239 | 12/1987 | Lee et al. | 148/104 |
| 4,770,723 | 9/1988 | Sagawa et al. | 148/302 |
| 4,818,201 | 4/1989 | Howard | 425/78 |

FOREIGN PATENT DOCUMENTS

| | | |
|---|---|---|
| 0133758 | 3/1985 | European Pat. Off. |
| 0231620 | 8/1987 | European Pat. Off. |
| 0270934 | 6/1988 | European Pat. Off. |
| 61-268006 | 7/1986 | Japan |
| 63-216317 | 9/1988 | Japan |
| 1447571 | 12/1988 | U.S.S.R. ................ 425/78 |

Primary Examiner—Jay H. Woo
Assistant Examiner—William J. Matney, Jr.
Attorney, Agent, or Firm—Finnegan, Henderson, Farabow, Garrett & Dunner

[57] ABSTRACT

Disclosed is a device for manufacturing Nd-Fe-B alloy magnet materials, and in particular, for manufacturing an integral, columnar-ring-shaped Nd-Fe-B magnet which is multi-pole-magnetized along the circumference thereof and which is used as the rotor magnet of a high-efficiency stepping motor. The device of this invention is composed of a die punch, an upper and a lower punch having two concentric sections. The space is defined by the die and the upper and lower punches includes induction means for heating the green compact or the densified compact and sealing means for keeping the die under a reduced pressure condition or in an inert gas atmosphere.

3 Claims, 3 Drawing Sheets

DEVICE FOR MANUFACTURING MAGNETICALLY ANISOTROPIC MAGNETS

This is a division of application Ser. No. 07/274,570 filed Nov. 23, 1988, now U.S. Pat. No. 4,960,469.

BACKGROUND OF THE INVENTION

This invention relates to a method of and a device for manufacturing Nd-Fe-B magnet materials which exhibit a great coercive force and a large magnetic energy product, and in particular, for manufacturing an Nd-Fe-B magnet material which is used as-the rotor magnet of a high-efficiency stepping motor, etc., i.e. a columnar-ring-like magnet which is multi-pole-magnetized along the circumference thereof. Such as magnetically anisotropic magnet material is manufactured by making, through plastic working, a green compact or a densified compact thereof anisotropic which is obtained by cold-forming an magnet material powder of an alloy composed of a rare earth metal, a transition metal and boron, for example, Nd-Fe-B magnet powder prepared by the molten-metal quenching method.

As disclosed, for example, in U.S. Pat. No. 4,770,723, it has been well-known to manufacture a sintered Nd-Fe-B magnet by forming in a magnetic field, sintering and heat-treating a powder prepared by pulverizing an ingot obtained by melting together and casting Nd, Fe and B as well as some additive elements added thereto as needed. On the other hand, a fine-crystal-type Nd-Fe-B magnet is also well known in the art, which magnet is made of Nd-Fe-B alloy powder in the form of fine crystal particles (with an average grain diameter of about 0.01 to 0.5 $\mu$m), so that it exhibits a high coercive force.

It is also known, as disclosed, for example, in European Patent Laid-Open Publication No. 133,758, that this fine-crystal particle type Nd-Fe-B magnet can be provided with magnetic anisotropy through upsetting.

According to other conventional methods, magnetic anisotropy can be imparted to such magnet materials through plastic working, or more specifically, through extrusion, drawing, etc. (as disclosed in Japanese Patent Laid-Open Publication No. 61-268006).

None of the above-mentioned conventional arts, however, allows such a magnet material to be used as a columnar ring-like rotor magnet of a high-efficiency stepping motor which magnet is multi-pole-magnetized along the circumference thereof. That is, in order to make such application possible, it is necessary that the area of the columnar-ring-like magnet which extends from the center to the outer peripheral section thereof is provided with a magnetic radial anisotropy or a magnetic polar anisotropy beforehand. In the sintering method, however, the coefficient of contraction of the axis which can be easily magnetized is different from that of the axis which is hard to magnetize, so that cracking or elliptical deformation of sintered compacts occurs during sintering. As a result, no products capable of being used for industrial purpose can be produced from this method. As to the upsetting method disclosed in European Patent Laid-Open Publication No. 133,758, it can only provide a uniaxial anisotropy which is parallel to the compression axis. No integral, columnar (cylindrical) ring-shaped magnet having a radial anisotropy can be produced from the method.

As for the extrusion and the drawing mentioned above, they necessitate a cutting step to obtain a final product, and there is such a problem as a part of material remains unworked, which means they are by no means to be regarded ideal from the industrial point of view.

SUMMARY OF THE INVENTION

It is accordingly an object of this invention to provide a method of effectively manufacturing a high-performance Nd-Fe-B magnet material which is substantially of the fine-crystal type and which exhibits, in a columnar-ring-like magnet, radial anisotropy in the circumferential direction of the magnet.

According to the first aspect of the invention, there is provided a method of manufacturing a magnetically anisotropic magnet material consisting of an alloy which is composed of a rare earth metal, transition metal and boron and whose average crystal grain size ranges from 0.01 to 0.5 $\mu$m, said method comprising the steps of: preparing a powder or flake material of amorphous and/or fine crystal grains obtained by rapidly quenching the molten alloy; compacting the power or flake material to thereby obtain a compact, optionally, or a densified compact which is formed by hot-working the compact; imparting magnetic anisotropy to the compact or to the densified compact by plastically deforming it while maintaining the compact or densified compact at a temperature of 600 to 850° C.: and subsequently imparting radial anisotropy or polar anisotropy.

Second, this invention provides a device for manufacturing magnetically anisotropic magnet materials, comprising: an upper punch; a die; a lower punch, said die having an upper through-hole with a large diameter adapted to the diameter of said upper punch, a lower through-hole with a diameter which is smaller than that of said upper punch, and a tapered section in the middle of the die, said lower punch being axially movable in the through-holes of said die, said upper punch being axially movable in such a manner as to close the upper and the middle sections of the through-holes formed in said die; means for heating a compact or a densified compact in a range of 600–850° C. in a space defined by the die and the upper and lower punches which compact is made of an alloy composed of rare earth metal transition metal and boron; and sealing means for keeping said die under a reduced pressure condition or in an inert gas atmosphere.

DETAILED DESCRIPTION OF THE PREFERRED EMBODIMENTS

Figure 1A:
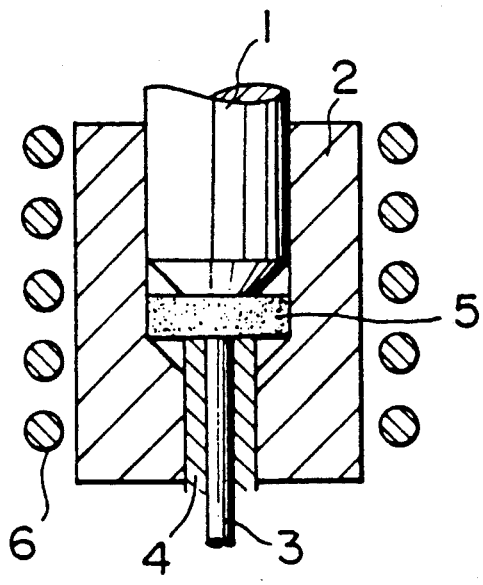
FIGS. 1A to 1D are schematic sectional views showing steps in one embodiment of this invention.

With respect to the composition of the magnet material in this invention, Pr provides approximately the same effect as Nd, so that Nd may be partly or entirely replaced by Pr. Further, by replacing Nd partly or entirely by Dy and Tb, a fine-crystal-type magnet which provides a high coercive force and which is excellent in thermal stability can be obtained. This fine crystal type magnet can minimize variation in the residual magnetic flux density with respect to change in temperature. Ce, which is contained in a low grade material commonly referred to as "didymium", can be used up to 10 atomic % without substantially reducing energy product of the magnet. The Curie point of the magnet can be raised by partly replacing Fe by Co, with the result that it becomes possible to improve the thermal stability and to minimize variation in the residual magnetic flux density with respect to change in temperature similar to the case of the addition of Dy and Tb. When the total amount of the elements Nd and R is less than 11 atomic %. a sufficient intrinsic coercive force cannot be obtained. On the other hand, when such total is more than 18 atomic %, the residual magnetic flux density is reduced. The total amount of the two elements is consequently selected to be in the range of 11 to 18 atomic %.

When the amount of B is less than 4 atomic %, since the formation of the $R_2Fe_{14}B$-phase is insufficient, and the residual magnetic flux density and the intrinsic coercive force are both low. When the B-amount exceeds 11 atomic %, a phase which is undesirable in magnetic properties appears, resulting in reduction in the residual magnetic flux density. Thus, the amount of B is selected to be in the range of 4 to 11 atomic %.

When the replacement amount (y) of Co with respect to Fe exceeds 0.3, the Curie point will be raised, but the anisotropic constant of the principal phase is reduced, so that a high $_iH_c$ cannot be obtained. Accordingly, y is selected to be not more than 0.3. When the amount (z) of the additive element M exceeds 3, the residual magnetic flux density is undesirably reduced to a great extent. Accordingly, z is selected to be not more than 3.

The alloy used in this invention may contain such impurities as Nb contained in ferroboron and as reducing agents mixed when reducing other rare earth elements. Addition of Ga, Zn, Al, Ta, Hf, Zr, or Ti as the element (M) particularly improves both the coercive force and the thermal stability of the magnet obtained.

When in this invention the average grain diameter of the fine crystal grains in the alloy exceeds 0.5 $\mu$m, the coercive force is undesirably reduced. An average grain size less than 0.01 $\mu$m also results in unfavorable reduction in the coercive force, which makes it impossible to obtain desired magnetic properties. The average grain size is accordingly to be in the range of 0.01 to 0.5 $\mu$m.

Figure 1B:
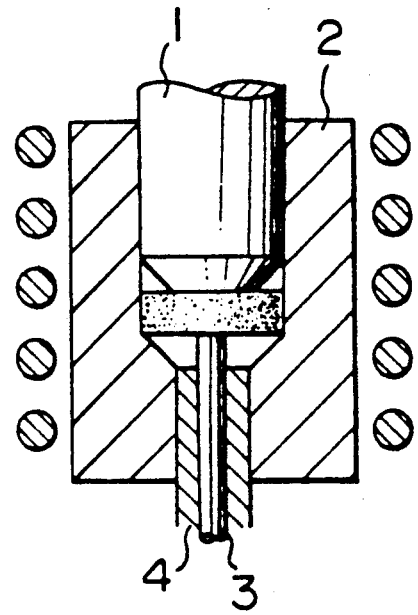

The flake or powder material used in the manufacturing method of this invention is prepared, for example, as follows;

First, an alloy with a predetermined composition is prepared through high-frequency melting or the like and is pulverized by the molten-metal-quenching method to thereby obtain power or flake. The powder or flake is compacted at room temperature to obtain a green compact. This green compact may be preferably subjected to plastic working for densifying it beforehand by use of a hot press or the like. The green compact or the densified compact thus obtained is set in the upper space of the die, as shown in FIGS. 1A and 1B, and is compressed by the action of the upper punch, with the temperature being kept at 600 to 850 degrees C. by, for example, high-frequency heating. By forcing it to pass through the tapered section in the middle of the die, the compact receives a compressive stress from the side wall of the die, so that easy-magnetization direction can be radially oriented toward the side wall. As will be appreciated, the existence of the tapered section causes the compressive stress to act in such a manner a to realize a magnetically anisotropic orientation. A plastic deformation temperature less than 600° C. will result in a large deformation resistance, making it difficult to force the compact through the tapered section. When, on the other hand, the temperature is more than 850° C., the growth of crystal grains occurs, resulting in an exceedingly reduced intrinsic coercive force $_iH_c$.

It is desirable that the alloy to which the invention is applied is subjected to plastic deformation in the temperature range of 700 to 760 degrees C. A temperature less than 700 degrees C. will result in a poor workability and a temperature more than 760 degrees C. causes grain-growth, which leads to deterioration in the coercive force.

In the invention, the strain rate in plastic deformation is determined by the taper angle of the tapered section in the die and the working speed of the upper punch, and is appropriately selected in accordance with the material composition and the desired magnetic properties.

The strain rate is preferably selected to be not less than about $1 \times 10^{-5}$/sec., because a strain rate lower than the value would result in too long cycle time. A strain rate which is rather too high, on the other hand, would result in an insufficient anisotropy and result in reduction in the ratio of orientation. The rate is consequently selected to be not more than about $1 \times 10^2$/sec. A particularly preferable strain rate which will result in a magnet having a satisfactory magnetic anisotropy ranges from about $4 \times 10^{-4}$ to about $4 \times 10^{-1}$/sec.

According to the invention, since the compression working of a green compact is efficiently effected, it is possible to obtain a final densified compact having a density of not less than 95% of the theoretical density of the material (, that is, 7.58 g/cc in the case of the intermetallic compound, $Nd_2Fe_{14}B$).

EXAMPLES

Working examples of the invention will now be described below.

(EXAMPLE 1)

$Nd_{14}Fe_{80}B_6$ alloy was prepared through arc melting and the melt was rapidly quenched or solidified by the single roll method in an Ar atmosphere to obtain flakes. The flakes obtained at a roll peripheral speed of 30 m/sec. were amorphous flakes with a thickness of about 30 $\mu$m, and were found, through X-ray analysis, to be a mixture of amorphous and crystalline flakes. These flakes were roughly pulverized until they were of 32-mesh or less and were formed into a green compact. The forming pressure was 6 ton/cm². No magnetic field was applied thereto.

This green compact was set in the upper section of the die, as shown in FIG. 1(a), and was heated up to a temperature of 750 degrees C. with a high-frequency heating while it was pressed with the lower punch inner and outer concentric sections (3), (4) (with a pressure of about 500 kgf/cm²).

Subsequently, the lower punch outer section (4) was lowered, as shown in FIG. 1(b), until it reached the lower end of the die tapered section. The upper punch was then lowered, with a pressure of 2 ton/cm², until it reached the upper end of the lower punch inner section (3). Further, the lower punch outer section (4) was lowered to a predetermined lower position in the die.

Figure 1C:
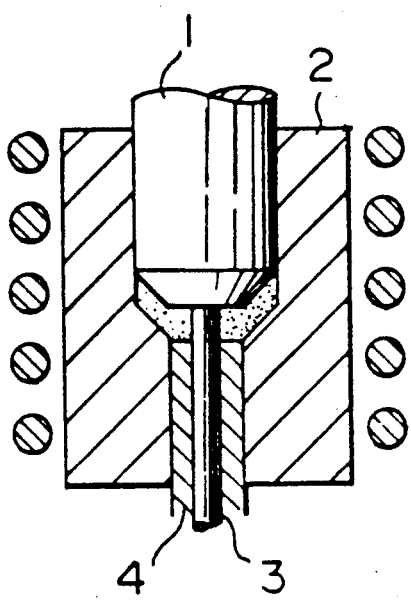
Figure 1D:
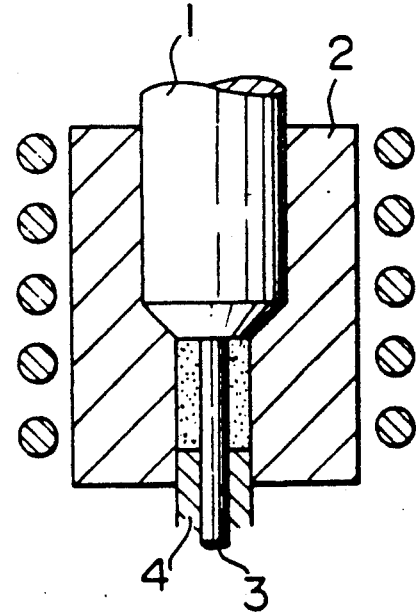
Figure 2:
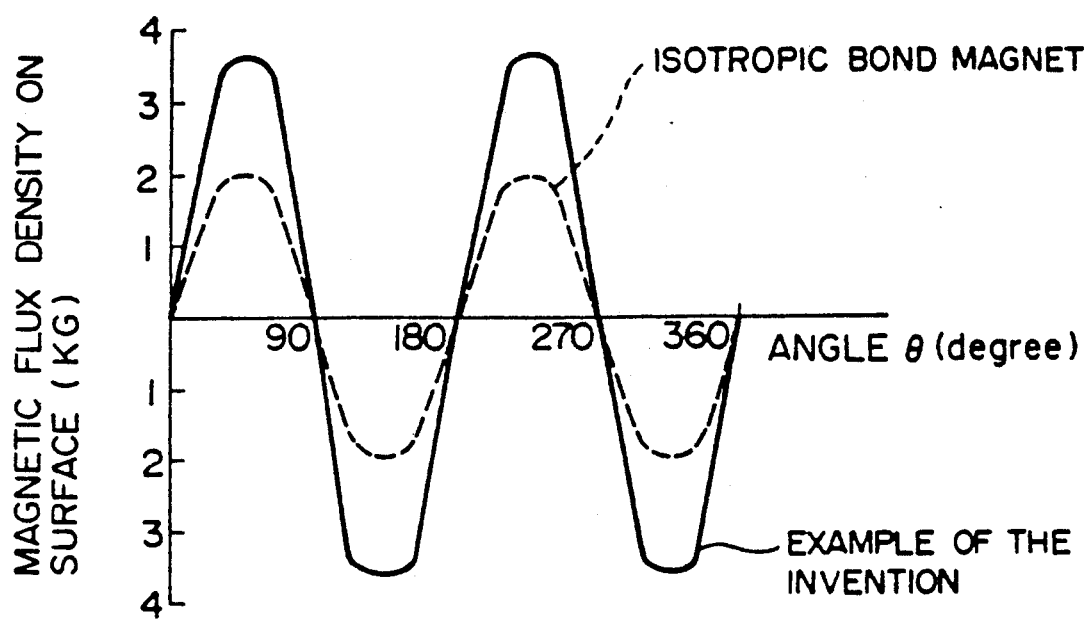
FIG. 2 is a graph showing surface magnetic flux density waveforms of a four-pole-anisotropic ring magnet obtained in accordance with this invention as compared with that of an isotropic bond magnet.

Further, as shown in FIG. 1(c), the upper punch (1) was lowered to the front end of the die tapered section. After that, the upper punch (1) was lowered, as shown in FIG. 1(d), to the lower end of the die tapered section with a pressure of 2 ton/cm$^2$, thereby effecting the plastic-deforming of the Nd-Fe-B alloy. After the plastic deformation, the upper punch was quickly raised to a predetermined position, and the lower punch outer section (4) was raised to the front end of the lower punch inner section (3), thus obtaining a columnar ring-like magnet having an outer diameter of 12 mm, an inner diameter of 5 mm, and a length of 30 mm. The magnet thus obtained was multi-pole-magnetized in four poles in the circumferential direction. Measurement of the surface magnetic flux density in the peripheral direction revealed that it had a magnetic flux density of 3600 G, which value is higher than that of a conventional isotropic Nd-Fe-B bond magnet (2000 G).

(EXAMPLE 2)

Figure 3A:
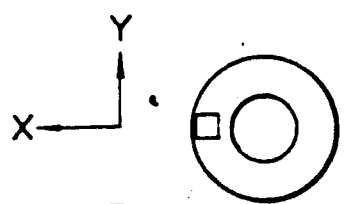
FIGS. 3A and 3B are top and plan view showing test-piece-cutting directions in another embodiment of this invention.
Figure 3B:
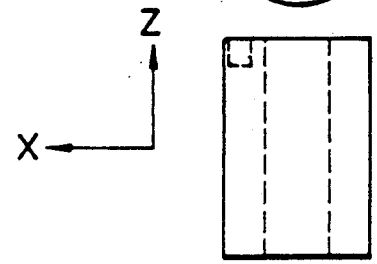

A cylindrical-ring-shaped magnet of $Nd_{14}Fe_{77}B_8Ga_1$ was prepared as in Example 1, and a cubic test piece of 2 mm×2 mm×2 mm shown in FIG. 3 was cut therefrom. The magnetic properties of this test piece in the X-, Y- and Z-directions were measured using a vibrating-specimen-type magnetic flux meter (VSM). The result is shown in Table 1, which indicates a quite satisfactory degree of orientation in the X-direction.

TABLE 1

|  | Br (KG) | $_BH_c$ (KOe) | $_IH_c$ (KOe) | $(NH)_{max}$ (MGOe) |
|---|---|---|---|---|
| x-direction | 10.8 | 9.5 | 17.0 | 27.0 |
| y-direction | 8.5 | 7.0 | 16.5 | 15.0 |
| z-direction | 6.0 | 4.5 | 17.0 | 7.0 |

(EXAMPLE 3)

A columnar-ring-like magnet of $Nd_{14}Fe_{79}B_6M_1$ (where M is at least one additive element selected from the group consisting of Zn, Al, Ta, Hf, Ti and Zn) was prepared in the same manner as in Example 1, and a test piece was cut therefrom as in Example 2. The magnetic properties of the test piece in the X-direction were measured, which resulted as shown in Table 2.

TABLE 2

| M | Br (KG) | $_BH_c$ (KOe) | $_IH_c$ (KOe) | $(BH)_{max}$ (MGOe) |
|---|---|---|---|---|
| Zn | 10.5 | 9.4 | 19.0 | 26.3 |
| Al | 10.2 | 9.0 | 15.3 | 24.0 |
| Ta | 10.4 | 9.1 | 17.0 | 25.0 |
| Hf | 10.4 | 9.2 | 16.5 | 25.1 |
| Ti | 10.3 | 9.0 | 16.0 | 25.0 |
| Zr | 10.4 | 9.1 | 18.0 | 25.0 |

(EXAMPLE 4)

Figure 4:
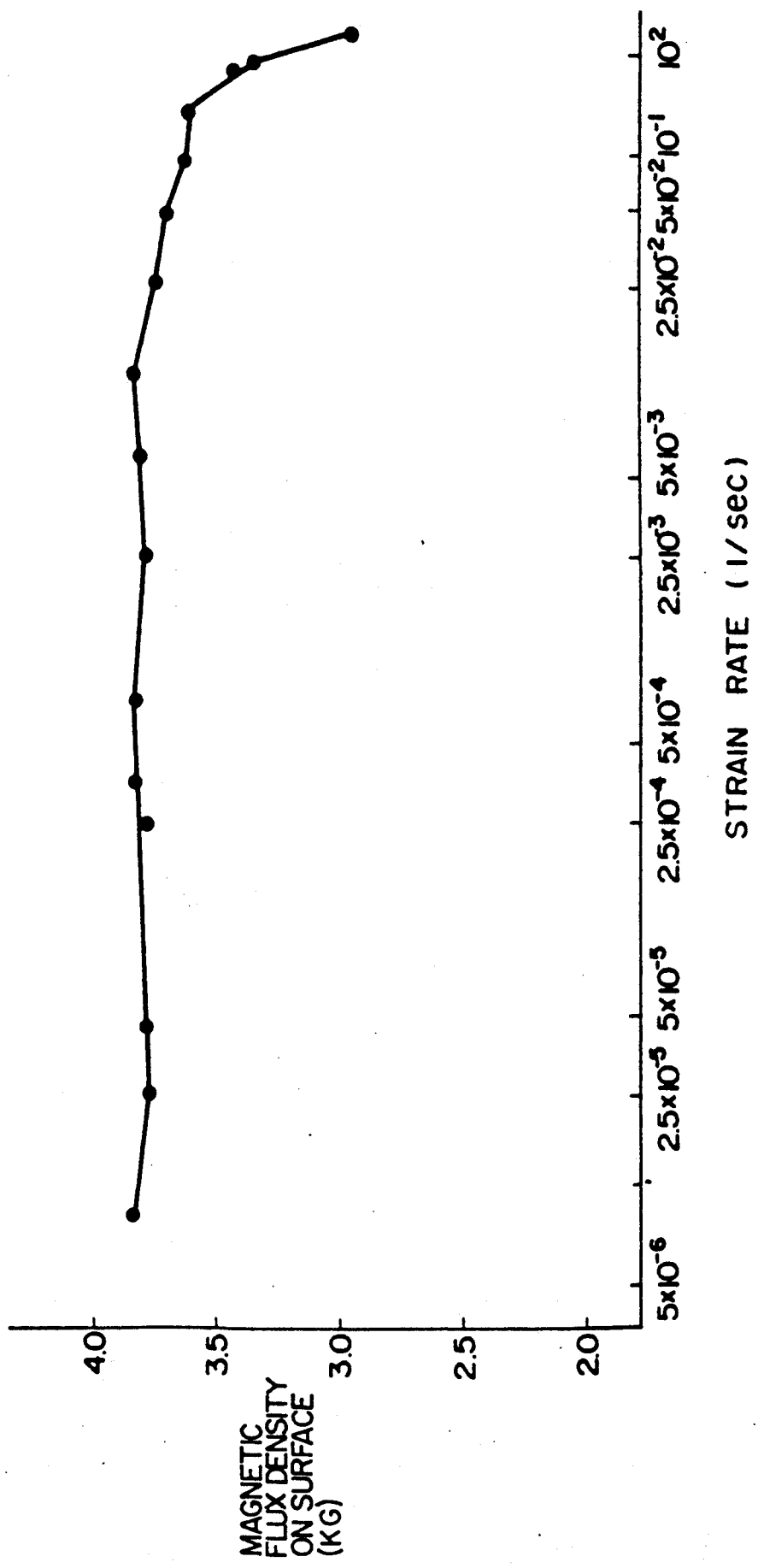
FIG. 4 is a graph showing the relation between strain rate and surface magnetic flux density obtained.

Molten $Nd_{14}Fe_{80}B_6M_1$-alloy was rapidly quenched or solidified to obtain flakes as in Example 1 and the flakes were pulverized until they were of 32-mesh or less in size. The flakes were pressed into a green compact, which was densified at a temperature of 650 degrees C. and with a pressure of 1.5 ton/cm$^2$ to obtain a densified compact having a density of 7.4 g/cc. The densified compact obtained was set in the upper section of the die, as in Example 1, and was subjected to plastic working while being heated up to 700 degrees C. through high-frequency heating. In performing the plastic working, the strain rate was varied by changing the descending speed of the upper punch, in order to examine the relation between the strain rate and the surface magnetic flux density. The results are shown in FIG. 4. Therefore, a particularly preferable strain rate ranges from about $1 \times 10^{-5}$/sec to about $1 \times 10^{-2}$/sec.

(EXAMPLE 5)

The magnetic properties of a ring magnet with a composition of $Nd_{14}Fe_{bal}B_6M_z(z=0$ to $3.5)$ where M is at least one additive element selected from the group consisting of Zn, Al, Ta, Hf, Ti, Zr and Ga were examined in the same manner as in Example 3. The examination revealed that a z-value of 3 or less results in satisfactory magnetic properties and that a z-value more than 3 involves a great reduction in Br.

TABLE 3

| Alloy composition (at %) | | | | Magnetic properties | | | | Remarks |
|---|---|---|---|---|---|---|---|---|
| Nd | Fe | B | M | Br (KG) | $_BH_c$ (KOe) | $_IH_c$ (KOe) | $BH_{max}$ MGOe | |
| 14 | 78 | 6 | Zn = 2 | 10.4 | 9.4 | 19.2 | 26.2 | Comparison |
| 14 | 77 | 6 | Zn = 3 | 10.0 | 9.7 | 19.4 | 26.0 | parison |
| 14 | 76.5 | 6 | Zn = 3.5 | 7.3 | 9.7 | 19.5 | 22.3 | example |
| 14 | 78 | 6 | Al = 2 | 10.1 | 9.1 | 15.4 | 24.0 | Comparison |
| 14 | 77 | 6 | Al = 3 | 10.0 | 9.3 | 15.6 | 23.8 | parison |
| 14 | 76.5 | 6 | Al = 3.5 | 7.2 | 9.3 | 15.6 | 20.2 | example |
| 14 | 78 | 6 | Ta = 2 | 10.3 | 9.2 | 17.2 | 25.0 | Comparison |
| 14 | 77 | 6 | Ta = 3 | 10.1 | 9.3 | 17.3 | 24.6 | parison |
| 14 | 76.5 | 6 | Ta = 3.5 | 7.6 | 9.3 | 17.4 | 22.1 | example |
| 14 | 78 | 6 | Hf = 2 | 10.4 | 9.2 | 16.5 | 25.0 | Comparison |
| 14 | 77 | 6 | Hf = 3 | 10.2 | 9.3 | 16.7 | 24.7 | parison |
| 14 | 76.5 | 6 | Hf = 3.5 | 7.4 | 9.3 | 16.8 | 21.3 | example |
| 14 | 78 | 6 | Ti = 2 | 10.2 | 9.1 | 16.1 | 24.9 | Comparison |
| 14 | 77 | 6 | Ti = 3 | 10.1 | 9.2 | 16.3 | 24.7 | parison |
| 14 | 76.5 | 6 | Ti = 3.5 | 7.9 | 9.2 | 16.3 | 22.7 | example |
| 14 | 78 | 6 | Zr = 2 | 10.3 | 9.1 | 18.1 | 24.9 | Comparison |
| 14 | 77 | 6 | Zr = 3 | 10.1 | 9.2 | 18.3 | 24.7 | parison |
| 14 | 76.5 | 6 | Zr = 3.5 | 7.8 | 9.2 | 18.3 | 21.9 | example |
| 14 | 78 | 6 | Ga = 2 | 10.7 | 9.6 | 17.8 | 27.0 | Comparison |
| 14 | 77 | 6 | Ga = 3 | 10.5 | 9.8 | 18.2 | 26.6 | parison |
| 14 | 76.5 | 6 | Ga = 3.5 | 8.3 | 9.8 | 18.3 | 22.0 | example |
| 14 | 78 | 6 | Ga = 1, Zn = 2 | 10.2 | 9.7 | 19.2 | 26.2 | |
| 14 | 77 | 6 | Ga = 1, Al = 2 | 10.1 | 9.4 | 15.7 | 23.9 | |

TABLE 3-continued

| Alloy composition (at %) | | | | Magnetic properties | | | | |
|---|---|---|---|---|---|---|---|---|
| Nd | Fe | B | M | Br (KG) | $_BH_c$ (KOe) | $_iH_c$ (KOe) | $BH_{max}$ MGOe | Remarks |
| 14 | 76.5 | 6 | Ga = 1, Zr = 2 | 10.3 | 9.2 | 18.3 | 24.8 | |

As described above, this invention makes it possible to effectively obtain a radially anisotropic or a pole-anisotropic Nd-Fe-B magnet having a high surface magnetic flux density.

What is claimed is:

1. A device for manufacturing magnetically anisotropic magnets from particulate material, the device comprising: an upper punch; a die for holding the particulate material; a lower punch, said die having an upper through-hole with a large diameter adapted to receive said upper punch, a lower through-hole with a diameter smaller than that of said upper punch, and a tapered section in the middle section thereof, said lower punch being axially movable in the through-holes of said die, said upper punch being axially movable in such a manner as to selectively close the upper and the middle sections of the through-holes formed in said die, said upper punch having means including a tapered end portion conforming to said tapered section for displacing material from said die tapered portion into said lower through-hole; means for heating a compact or a densified compact in a range of 600–850° C. in a space defined by the die and the upper and lower punches; and sealing means for keeping said die under a reduced pressure condition or in an inert gas atmosphere.

2. The device as claimed in claim 1, wherein said lower punch further comprises a plurality of concentric lower punch sections each individually vertically movable in the axial direction of the die.

3. The device as in claim 2 wherein said lower punch includes an inner concentric punch section cooperating with the wall of said lower through-hole for defining a cylindrical space for receiving material displaced by said displacing means.

* * * * *